No. 662,763. Patented Nov. 27, 1900.
B. B. CARTER.
IMPACT ENGINE.
(Application filed July 19, 1900.)
(No Model.) 3 Sheets—Sheet 1.
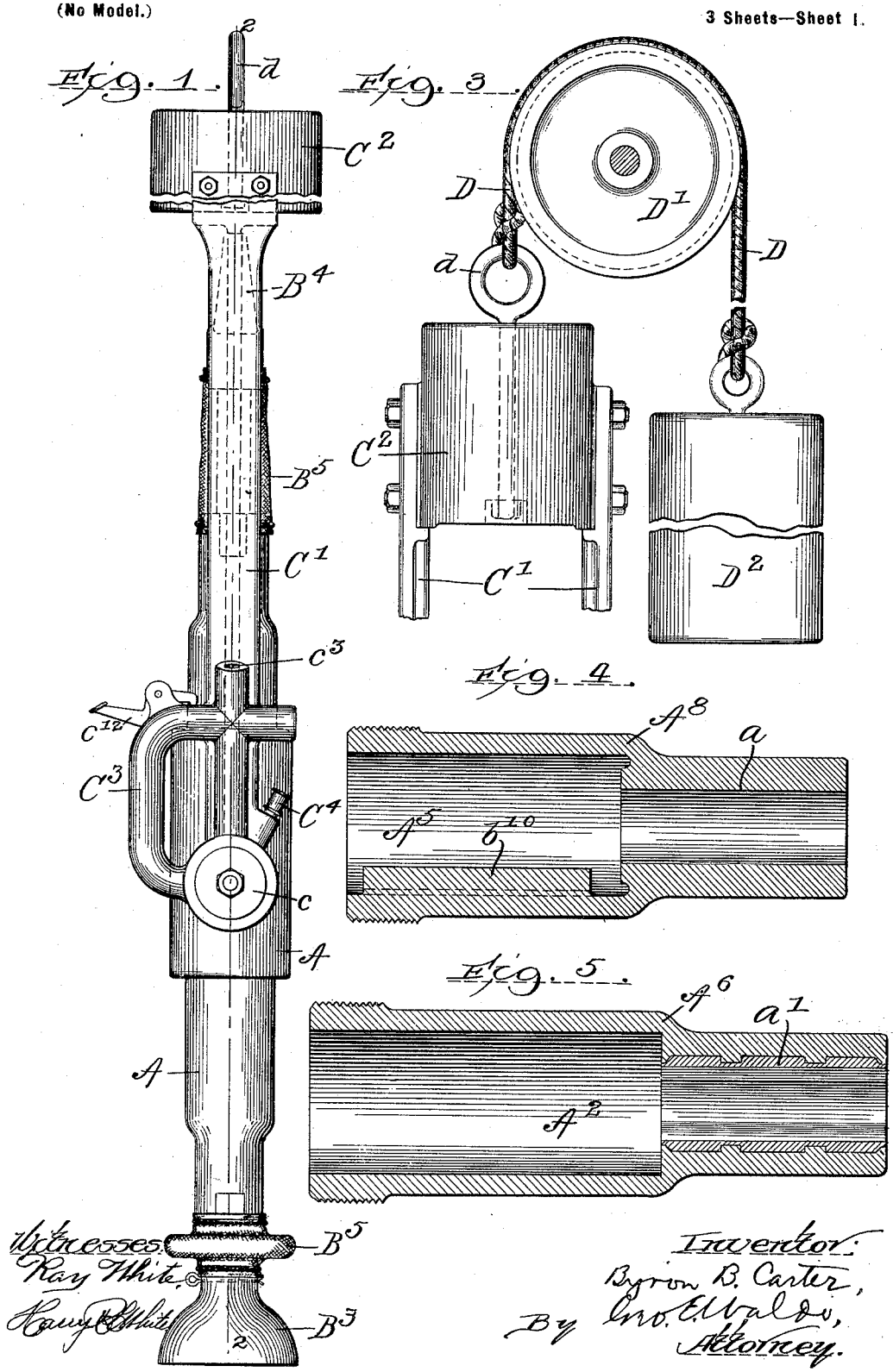
Witnesses
Ray White
Harry B. White
Inventor:
Byron B. Carter,
By Ino. E. Waldo,
Attorney.

No. 662,763.  
B. B. CARTER.  
IMPACT ENGINE.  
(Application filed July 19, 1900.)  
Patented Nov. 27, 1900.
(No Model.)  
3 Sheets—Sheet 2.
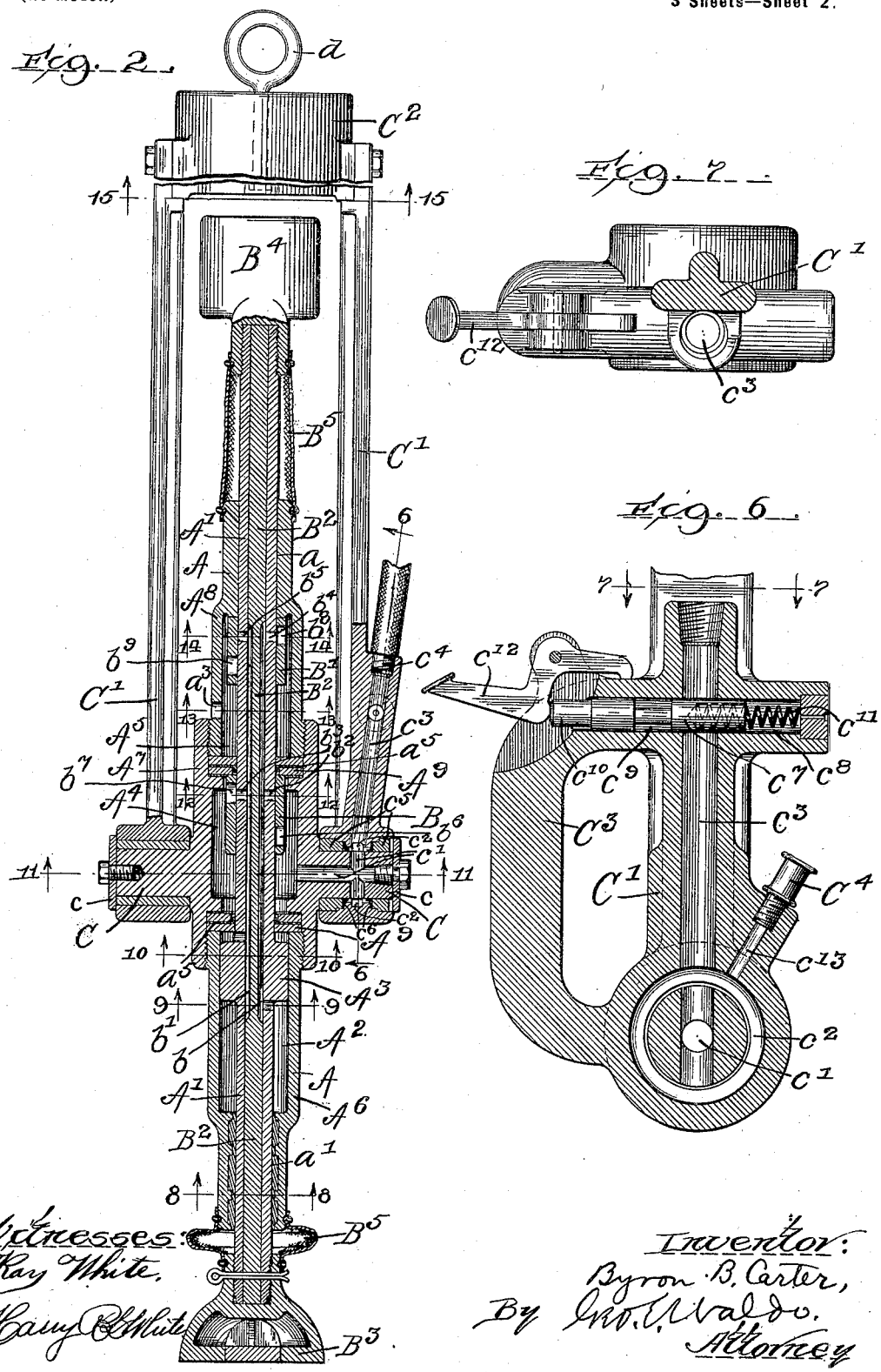

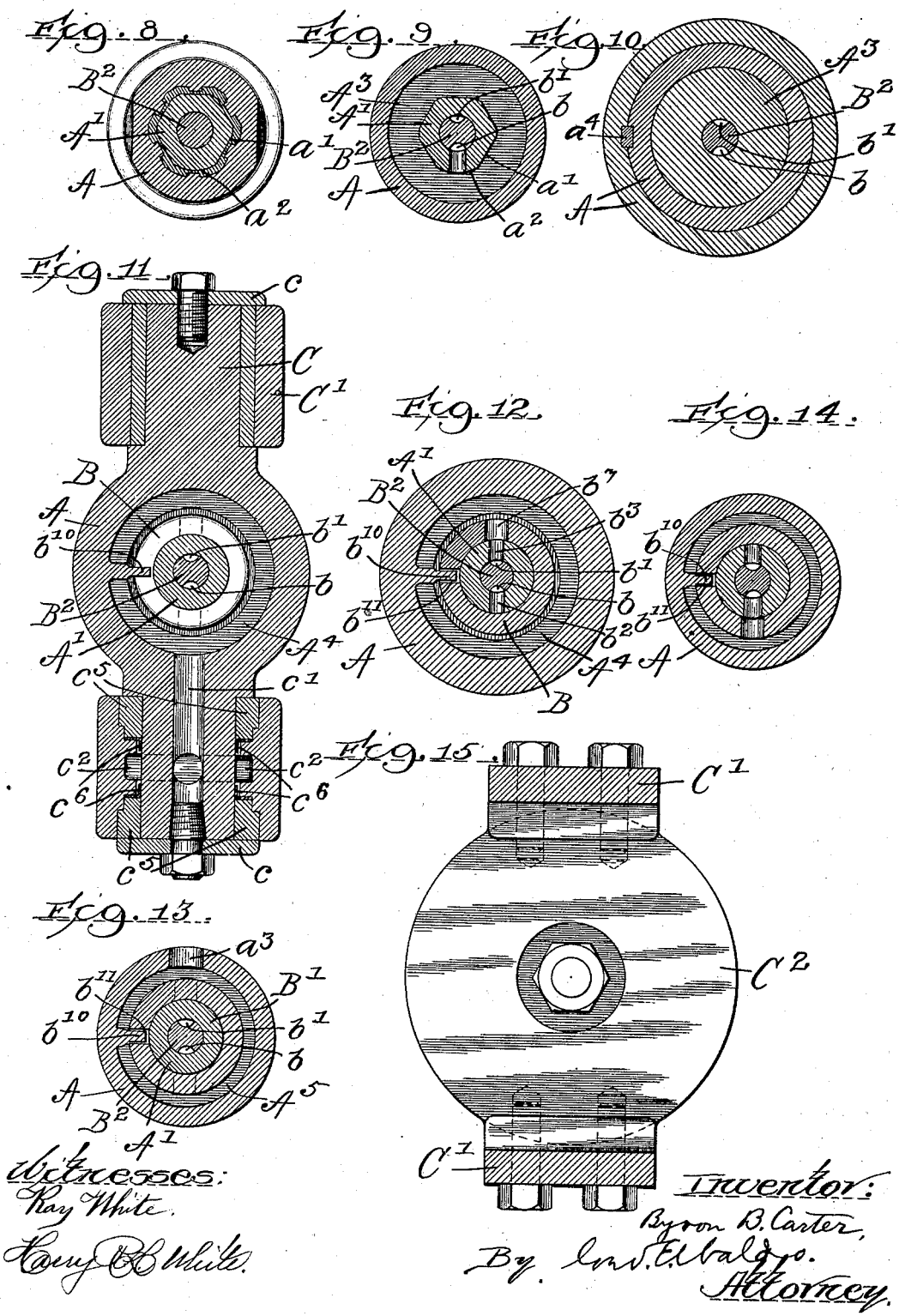

UNITED STATES PATENT OFFICE.

BYRON B. CARTER, OF HINSDALE, ILLINOIS.

IMPACT-ENGINE.

SPECIFICATION forming part of Letters Patent No. 662,763, dated November 27, 1900.

Application filed July 19, 1900. Serial No. 24,138. (No model.)

*To all whom it may concern:*

Be it known that I, BYRON B. CARTER, a citizen of the United States, and a resident of Hinsdale, in the county of Du Page and State of Illinois, have invented an Improved Impact-Engine, of which the following is a specification.

This invention relates to impact-engines, and relates particularly to impact-engines designed and adapted to be operated by fluid under pressure.

Primary objects of my invention are to provide a double-ended impact-engine adapted to strike with either end and supported in such manner that it may be reversed end for end or turned at any desired angle either about a horizontal or a vertical axis; to provide an impact-engine consisting of few parts; to eliminate as far as possible in the construction thereof screws, bolts, and other parts liable to be shaken loose by the vibration of the engine in operation; to provide improved and simplified means for controlling the admission of fluid under pressure to the cylinder of said engine and its discharge therefrom, and generally to provide an impact-engine of simple and relatively cheap construction which will be efficient and reliable in its operation.

An impact-engine of my invention consists of the various features, combinations of features, and details of construction hereinafter described and claimed.

One use for which an impact-engine of my invention is especially adapted is that of a rammer for making sand molds for castings, and for the purposes of illustration I have in the accompanying drawings shown my invention as embodied in such a rammer.

Figure 1 is a side view of a rammer embodying my invention. Fig. 2 is a sectional view thereof on the line 2 2 of Fig. 1. Fig. 3 shows the method of supporting my rammer. Figs. 4 and 5 are enlarged details. Fig. 6 is an enlarged sectional view on the line 6 6 of Fig. 2. Fig. 7 is a plan section on the line 7 7 of Fig. 6; and Figs. 8, 9, 10, 11, 12, 13, 14, and 15 are enlarged plan sections on the lines 8 8, 9 9, 10 10, 11 11, 12 12, 13 13, 14 14, and 15 15, respectively, of Fig. 2.

A rammer embodying my invention consists of a body portion or casing A, fitted to and longitudinally movable in suitable bearings $a$ $a'$, in which is a rod or stem $A'$. As shown, said bearings are formed at the ends of said casing A, and at least one thereof is flattened on one or more sides, thus preventing turning of said casing and stem relatively to each other. As shown, the bearing $a'$ is hexagonal, being flat on five sides, while the sixth side $a^2$ is left circular. Thus said rod or stem $A'$ can be inserted into said casing A in one position only, affording a convenient base for laying out correlative parts of said casing and said rod or stem. A sufficiently tight joint can be conveniently formed by making said bearing of Babbitt metal, as indicated, which can be done in the usual manner. Formed in said casing A is a cylinder $A^2$, to which is fitted a piston $A^3$ on the rod or stem $A'$. Separate valve-compartments $A^4$ $A^5$ are also formed in said casing A, of which the compartment $A^4$ is in controlled communication with a source of supply of fluid under pressure, and the compartment $A^5$ communicates with the atmosphere by means of an exhaust-port $a^3$.

In the preferable construction shown the casing A is made in three sections $A^6$ $A^7$ $A^8$, in which, respectively, are formed the cylinder $A^2$ and the valve-compartments $A^4$ $A^5$, said sections being secured together by means of screw-threads and relative rotation thereof being prevented by means of keys $a^4$. As shown also the cylinder $A^2$ and the valve-compartments $A^4$ $A^5$ are separated from one another by means of heads $A^9$, removably secured in position by clamping them between the sections of said rammer-casing, said heads being provided with bearings for the stem or rod $A'$. As desirably constructed said heads $A^9$ each consists of two collars, between which are secured a cupped-leather packing $a^5$, adapted to render the bearings in said heads $A^9$ tight against unbalanced pressure in the compartment $A^4$.

Fluid under pressure is admitted to and discharged from the cylinder $A^2$ through passage-ways $b$ $b'$, formed in the rod or stem $A'$, which communicate with said cylinder $A^2$ on opposite sides of the piston $A^3$ and are provided with ports or openings $b^2$ $b^3$ $b^4$ $b^5$, of which the ports or openings $b^2$ $b^3$ connect said passage-ways, respectively, with the valve-chamber $A^4$ and the ports or openings $b^4$ $b^5$ connect said passage-ways, respectively, with the valve-chamber $A^5$.

The ports $b^2$ $b^3$ are controlled by a valve B and the ports $b^4$ $b^5$ by a valve B'. As shown, said valves B B' consist of sleeves fitted to and longitudinally movable on the rod or stem A', said valves being in sufficiently strong frictional engagement with said rod or stem A' to maintain them in fixed longitudinal adjustment thereon, except under the influence of a moving force.

Formed adjacent to the opposite ends of the valve B are ports $b^6$ $b^7$, adapted to be brought into register with the ports $b^2$ $b^3$, respectively, by longitudinal movement of said valve on the stem or rod A', and formed adjacent to the opposite ends of the valve B' are ports $b^8$ $b^9$, adapted to be brought into register with the ports $b^4$ $b^5$, respectively, by longitudinal movement of said valve B' on said stem or rod A'.

The valves B B' are maintained in fixed angular adjustment on the rod or stem A' by keys $b^{10}$, preferably formed integral with the casing A, which engage grooves or keyways $b^{11}$ in said valves, the relation being such that when assembled the ports $b^2$ $b^3$ will be in alinement with the ports $b^6$ $b^7$, respectively, and the ports $b^4$ $b^5$ with the ports $b^8$ $b^9$, respectively.

In the preferable construction shown the valves B B' are shorter than the valve-chambers $A^4$ $A^5$, in which they are respectively contained, such differences in length, however, being less than the travel of the piston $A^3$, and thus of the rod or stem A', by an amount substantially equal to the longitudinal distances between the ports $b^6$ $b^7$ and $b^8$ $b^9$ of the valves B B', respectively. With this construction it is obvious that each time the piston $A^3$ makes a full stroke the valves B B' will be moved longitudinally on the rod or stem A', and the relation of parts is such that when said piston is at one end of its stroke the admission-port $b^6$ of the valve B will be in register with the port $b^2$ and the exhaust-port $b^9$ of the valve B' will be in register with the port $b^5$, and when said piston is at the other end of its stroke the admission-port $b^7$ of the valve B will be in register with the port $b^3$ and the exhaust-port $b^8$ of the valve B' will be in register with the port $b^4$. With this construction it is obvious that the admission-ports $b^2$ $b^3$ and the exhaust-ports $b^4$ $b^5$, corresponding to the open admission-port, will remain open during only a portion of the piston-stroke equal to the difference between the lengths of the valves B B' and the valve-chambers $A^4$ $A^5$, respectively, as said valves, striking the ends of said valve-chambers, will be moved to close the open admission and exhaust ports. It is also obvious that as soon as the admission-port is closed the piston will operate on expansion of the fluid in the cylinder and that as soon as the exhaust-port closes a cushion will form in front of the piston, so that by properly proportioning the lengths of said valves relatively to the valve-chambers and the longitudinal distances between the admission-ports $b^6$ $b^7$ and the exhaust-ports $b^8$ $b^9$ the rammer may be caused to work on any desired expansion and any desired cushion formed in front of the piston, or the same results could be attained by elongating either or both sets of admission and exhaust openings without varying the lengths of said valves B B'. In fact, by providing ports of proper lengths said valves B B' could be made of the same lengths as the valve-chambers $A^4$ $A^5$, respectively, in which case said valves would always remain stationary. The effect of this construction, however, would be to increase the wear on said valves, due to the movement of the rod or stem A' therethrough.

The valves B B' may be made of any suitable material, the fluid used for operating the engine controlling the selection of the material to a considerable extent. In practice when the engine has been operated by compressed air I have used vulcanized fiber and have found it well adapted for the purpose. In case steam were to be used or other fluid calculated to swell fiber any desired impermeable substance may be used—even iron.

In the preferable construction shown the passage-ways $b$ $b'$ are formed by grooves formed longitudinally in the surface of a rod $B^2$, fitted to and preferably soldered into a hole formed longitudinally in the rod or stem A', so that a practically tight joint will be formed between said rod $B^2$ and the inclosing rod or stem A'.

It is obvious that a rammer embodying my invention may be constructed to strike with one or both ends.

The rammer shown in the drawings is adapted to strike with both ends. To effect this, the rod or stem A' projects at both ends beyond the casing A and has secured to one end thereof a butt $B^3$ and to its opposite end a peen $B^4$, and the valves are so constructed and proportioned that said rammer will be driven in both directions with substantially equal force.

To prevent access of sand or other grit to the bearings of the rod or stem A' in the casing A, which would operate to rapidly wear said bearings, shields $B^5$ are provided which entirely inclose the projecting ends of said rod or stem. As shown, said shields $B^5$ consist of tubes of suitable flexible material, preferably thin sheet-rubber or the like, one attached to each end of the casing A and to the butt $B^3$ and peen $B^4$, respectively, at their other ends.

The casing A of a rammer or engine of my invention is mounted in a suitable supporting-frame, preferably in such manner that it may be reversed end for end or turned at any desired angle either about a horizontal or a vertical axis.

In the preferable construction shown the casing A is provided with trunnions C, preferably located at about its center of gravity longitudinally, which engage suitable bearings formed in the ends of arms C', the upper ends of which are preferably rigidly secured to an inertia-weight C², which, with the casing of the rammer and adjunctive parts, will weigh about the same or a little less than the blow said rammer is designed to strike. Thus the full efficiency of the rammer will be obtained.

Caps $c$, secured to the trunnions C outside of their bearings in the arms C', maintain said trunnions in engagement with their bearings in said arms against possibility of accidental disengagement.

Fluid under pressure is admitted to the valve-compartment A⁴ in the following manner: Formed in one of the trunnions C is a passage $c'$, which connects the valve-chamber A⁴ with an opening $c^2$, which extends around the interior of said trunnion-bearing, which also communicates with a passage $c^3$, formed in one of the arms C', said passage $c^3$ being connected with a suitable source of supply of fluid under pressure by means of a flexible tube. (Not shown.) As shown, a short metal tube $c^4$ is secured in the open end of the passage $c^3$, affording convenient means for attaching said flexible supply-tube. My invention, however, contemplates forming the opening $c^2$ in the surface of the trunnions C.

In the preferable construction shown bushings $c^5$ are provided on opposite sides of the trunnion-bearing, through which fluid is admitted to the valve-chamber A⁴. Said bushings $c^5$ are preferably threaded into the arm C' and are made with straight inner faces adapted to bear against corresponding shoulders formed on said arm C', cupped-leather packings $c^6$ being secured between the abutting ends of said bearing and bushings adapted to render said bearings tight against the pressure of fluid in the opening $c^2$.

The admission of fluid under pressure to the valve-chamber A⁴ is controlled by means of a suitable valve applied to the passage leading thereto. As shown, said valve consists of a plug $c^7$, fitted to and longitudinally movable in a suitable hole or opening $c^8$, which intersects said passage across its entire area. The body of said plug will thus operate to entirely close said fluid-passage. Formed in the surface of said plug $c^7$ is a groove $c^9$, which may be brought into register with said fluid-passage by proper movement of said plug $c^7$, so as to open said passage in an obvious manner. A projecting end $c^{10}$ of the plug $c^7$ affords convenient means for manipulating said plug. A spring $c^{11}$, applied to said plug $c^7$, maintains said plug normally at one limit of its travel, in which position said fluid-passage will be closed, while said plug may be moved against the force of the spring $c^{11}$ to bring the groove $c^9$ into register with the fluid-passage, and thus open said passage by pressing on the projecting end $c^{10}$ of said plug in an obvious manner.

As shown, the valve-plug $c^7$ is manipulated by means of a trigger $c^{12}$, pivoted on the arm C' in proper position. As shown also, the trigger $c^{12}$ is pivoted at the upper end of a handle C³, formed on the arm C' for convenience in handling the rammer, the position being preferably such that said trigger may be conveniently manipulated by the thumb of the hand grasping said handle.

Oil for lubricating the engine is delivered thereto through an oil-hole $c^{13}$, formed in the arm C', in which the opening $c^2$ is formed and which communicates with said opening $c^2$. As shown, an oil-cup C⁴ is secured therein, the oil descending from said cup C⁴ through the passage $c^{13}$ into the opening $c^2$, whence it is carried through the entire engine by the current of fluid under pressure delivered to said engine.

A rammer or engine of my invention may be supported in operative position in any desired manner. I prefer, however, to suspend it at the end of a rope or cable D, attached to a ring $d$ on the inertia-weight C², which passes over a pulley D' and has a counterbalance-weight D² attached to its opposite end.

I claim—

1. In an impact-engine, the combination of a casing within which are formed an actuating-cylinder and separate valve-chambers, one of said valve-chambers being provided with a controlled passage for the admission of fluid under pressure and the other with an exhaust-opening, a rod or stem fitted to and longitudinally movable in bearings formed in the casing of said engine, a piston on said rod fitted to the cylinder in said casing, passages in said rod or stem which communicate with the cylinder on opposite sides of the piston, ports or openings which connect each of said passages with the admission and exhaust valve chambers and valves in said valve-chambers which control said ports or openings, substantially as described.

2. In an impact engine, the combination of a casing within which are formed an actuating-cylinder and separate valve-chambers, one of said valve-chambers being provided with a controlled passage for the admission of fluid under pressure and the other with an exhaust-opening, a rod or stem fitted to and longitudinally movable in bearings formed in the casing of said engine, a piston on said rod or stem fitted to the cylinder in said casing, passages in said rod or stem which communicate with the cylinder on opposite sides of the piston, ports or openings which connect each of said passages with the admission and exhaust valve chambers and valves in said valve-chambers operated by the movement of said rod or stem which control said ports or openings, substantially as described.

3. In an impact-engine, the combination of a casing within which are formed an actuating-cylinder and separate valve-chambers, one of said valve-chambers being provided with a controlled passage for the admission of fluid under pressure and the other with an exhaust-opening, a rod or stem fitted to and longitudinally movable in suitable bearings in said casing, a piston on said rod or stem fitted to the cylinder in said casing, passages in said rod or stem which communicate with the cylinder on opposite sides of the piston, ports or openings which connect each of said passages with the admission and exhaust valve chambers, valves in said chambers which control the ports or openings to said passages by movement of said rod or stem relatively to said valves, said valves being of lengths differing from their respective valve-chambers by amounts less than the travel of the piston, substantially as described.

4. In an impact-engine, the combination of a casing within which are formed an actuating-cylinder and separate valve-chambers, one of said valve-chambers being provided with a controlled passage for the admission of fluid under pressure and the other with an exhaust-opening, a rod or stem fitted to and longitudinally movable in bearings formed in said casing, a piston on said rod or stem fitted to the cylinder in said casing, passages in said rod or stem which communicate with the cylinder on opposite sides of the piston, ports or openings which connect each of said passages with the admission and exhaust valve chambers, valves in said valve-chambers which control said ports or openings to said passages, said valves consisting of sleeves fitted to and longitudinally movable on said rod or stem, the difference between the lengths of which and of their respective chambers is less than the travel of the piston and ports or openings in said valves adapted to be brought into register with those to the passages in the rod or stem by longitudinal movement of said valves relatively to said rod or stem, substantially as described.

5. In an impact-engine, the combination of a casing in which are formed an actuating-cylinder and separate valve-chambers, one of which is provided with a controlled passage for the admission of fluid under pressure and the other with an exhaust-opening, a rod or stem fitted to bearings in the casing of said engine, a piston on said rod or stem fitted to the cylinder in said casing, passages in said rod or stem which communicate with said cylinder on opposite sides of said piston, ports or openings which connect each of said passages with the admission and exhaust valve chambers, valves in said chambers which control said ports or openings to said passages, said valves consisting of sleeves fitted to and longitudinally movable on said rod or stem, ports or openings in said valves adapted to be brought into register with the ports or openings to the passages in said rod or stem and means to maintain said valves in fixed angular adjustment on said rod or stem, substantially as described.

6. In an impact-engine, the combination of a casing in which are formed an actuating-cylinder and separate valve-chambers, one of which is provided with a controlled passage for the admission of fluid under pressure and the other with an exhaust-opening, a rod or stem fitted to and longitudinally movable in bearings formed in the casing of said engine, a piston on said rod or stem fitted to the cylinder in said casing, means to maintain said rod or stem in fixed angular position relatively to said casing, passages in said rod or stem which communicate with the actuating-cylinder on opposite sides of the piston, ports or openings which connect each of said passages with the admission and exhaust valve chambers, valves in said chambers which control said ports or openings to the passages in said rod or stem, said valves consisting of sleeves fitted to and longitudinally movable on said rod or stem, ports or openings in said valves adapted to be brought into register with the ports or openings to the passages in said rod or stem by longitudinal movement of said valves on said rod or stem and means to maintain said valves in fixed angular adjustment on said rod or stem, substantially as described.

7. In an impact-engine, the combination of a casing in which are formed an actuating-cylinder and separate valve-chambers, one of which is provided with a controlled passage for the admission of fluid under pressure and the other with an exhaust-opening, a rod or stem fitted to and longitudinally movable in suitable bearings in the casing of said engine, one of said bearings comprising at least one flat side, a piston on said stem fitted to the actuating-cylinder, passages which connect said valve-chambers with said actuating-cylinder on opposite sides of the piston and valves which control said passages, substantially as described.

8. In an impact-engine, the combination of a casing in which are formed an actuating-cylinder and separate valve-chambers, one of said valve-chambers being provided with a controlled passage for the admission of fluid under pressure and the other with an exhaust-opening, a rod or stem fitted to and longitudinally movable in suitable bearings in the casing of said engine, one of said bearings comprising curved and flat sides, a piston on said rod or stem fitted to the actuating-cylinder, passages which connect the valve-chambers with the actuating-cylinder on opposite sides of the piston and valves which control said passages, substantially as described.

9. In an impact-engine, the combination of a casing in which are formed an actuating-cylinder and separate valve-chambers, one of said valve-chambers being provided with a controlled passage for the admission of fluid under pressure and the other with an exhaust-opening, a rod or stem fitted to and longitudinally movable in suitable bearings in the casing of said engine, means to maintain said rod or stem in fixed angular adjustment relatively to said casing, passages in said rod or stem, which communicate with the actuating-cylinder on opposite sides of said piston, ports or openings which connect each of said passages with said valve-chambers, valves which control said ports or openings, said valves consisting of sleeves fitted to and longitudinally movable on said rod or stem, ports or openings in said valves adapted to be brought into register with the ports or openings to the passages in said rod or stem by movement of said sleeves longitudinally of said stem and ribs or keys on the interiors of said valve-chambers which engage grooves formed longitudinally in the surface of said valves, substantially as described.

10. In an impact-engine, the combination of a casing in which are formed an actuating-cylinder and separate valve-chambers, one of said valve-chambers being provided with a controlled passage for the admission of fluid under pressure and the other with an exhaust-opening, a rod or stem fitted to and longitudinally movable in suitable bearings in the casing of said engine, one of said bearings comprising non-interchangeable flat and round surfaces, a piston on said rod or stem fitted to the actuating-cylinder, passages formed in said rod or stem which communicate with the actuating-cylinder on opposite sides of the piston, ports or openings which connect each of said passages with the valve-chambers, valves which control said ports or openings, said valves consisting of sleeves fitted to and longitudinally movable on said stem, ports or openings in said sleeves adapted to be brought into register with the ports or openings to the passages in said rod or stem by movement of said sleeves longitudinally of said rod or stem and ribs or keys on the interiors of said valve-chambers which engage grooves formed longitudinally in the surfaces of said sleeves, substantially as described.

11. In an impact-engine, the combination of a casing in which are formed an actuating-cylinder and separate valve-chambers, one of said valve-chambers being provided with a controlled passage for the admission of fluid under pressure and the other with an exhaust-opening, a rod or stem fitted to and longitudinally movable in suitable bearings in the casing of said engine, a piston on said rod or stem fitted to the actuating-cylinder, a bore formed longitudinally in said rod or stem, a rod secured in said bore, grooves formed longitudinally in the surface of said smaller rod forming longitudinal passages in the main rod or stem, holes which connect said passages with the actuating-cylinder on opposite sides of the piston, respectively, ports or openings which connect each of said passages with the valve-chambers and valves which control said ports or openings, substantially as described.

12. In an impact-engine, the combination of a casing comprising three sections secured together by screw-threads and keys to prevent relative movement of the sections of said casing, heads clamped between the sections of said casing, which divide the interior of said casing into an actuating-cylinder and separate valve-compartments, one of said valve-compartments being provided with a controlled passage for the admission of fluid under pressure and the other with an exhaust-opening, a rod or stem fitted to and longitudinally movable in suitable bearings in the casing of said engine, a piston on said rod or stem fitted to the actuating-cylinder, passages in said rod or stem which respectively communicate with the actuating-cylinder on opposite sides of the piston on said rod or stem, ports or openings which connect each of said passages with the valve-chambers and valves which control said ports or openings, substantially as described.

13. The combination with an impact-engine, comprising a casing, a rod or stem fitted to and longitudinally movable in suitable bearings in said casing and means to impart a reciprocating movement to said rod or stem, of a supporting-frame in which the casing of said engine is pivotally supported so that it may be turned end for end, substantially as described.

14. The combination with an impact-engine comprising a casing, a rod or stem fitted to and longitudinally movable in suitable bearings in said casing and means to impart a reciprocating movement to said rod or stem, of a supporting-frame in which the casing of said engine is pivotally mounted, the means for so mounting said casing in said frame comprising trunnions formed on one thereof adapted to engage suitable bearings in the other thereof, substantially as described.

15. The combination with an impact-engine of the type described, of a supporting-frame provided with bearings to which are fitted trunnions formed on the casing of the engine, the passage admitting fluid under pressure to said engine comprising sections formed in one of the trunnions on the casing and in the supporting-frame, both of which communicate with an opening formed around the bearing of said trunnion, substantially as described.

16. The combination with an impact-engine of the type described, of a supporting-frame therefor comprising arms in which are formed bearings to which are fitted trunnions on the casing of the engine, the passage for the admission of fluid under pressure to said engine comprising sections formed in one of said trunnions and in the supporting-arm in which said trunnion is mounted, both of which communicate with an opening formed around the trunnion-bearing, substantially as described.

17. The combination with an impact-engine, of the type described, of a frame provided with bearings to which trunnions formed on the casing of the engine are fitted, the passage for the admission of fluid under pressure to said engine comprising sections formed in one of the trunnions on the casing and in the supporting-frame, both of which communicate with an opening formed around the trunnion-bearing, the trunnion-bearing containing said opening being bushed on both sides and cupped-leather packing secured between said bushings and the ends of the recesses in which they are secured adapted to render said bearings tight against pressure in the opening in said bearing, substantially as described.

18. The combination with an impact-engine comprising a casing, a rod or stem fitted to and longitudinally movable in suitable bearings in said casing and means to impart a reciprocating movement to said rod or stem, of an inertia-weight and connection between said inertia-weight and the casing of the engine, substantially as described.

19. The combination with an impact-engine, comprising a casing, a rod or stem fitted to and longitudinally movable in suitable bearings in said casing and means to impart a reciprocating movement to said rod or stem, of a supported inertia-weight and rigid connection between said inertia-weight and the casing of said engine, substantially as described.

20. The combination with an impact-engine, comprising a casing, a rod or stem fitted to and longitudinally movable in suitable bearings in said casing and means to impart a reciprocating movement to said rod or stem, of an inertia-weight and arms thereon in which the casing of said engine is pivoted, substantially as described.

21. The combination with an impact-engine, comprising a casing, a rod or stem fitted to and longitudinally movable in suitable bearings in said casing and means to impart a reciprocating movement to said rod or stem, of a supported inertia-weight and rigid arms thereon in which the casing of said engine is pivoted, substantially as described.

22. The combination with an impact-engine of the type described, of an inertia-weight, arms thereon in which the casing of the engine is pivotally mounted, the means for so mounting said engine-casing in said arms comprising trunnions formed on one thereof adapted to engage bearings in the other thereof, the passage admitting fluid under pressure to said engine comprising a section formed in one of the trunnions, substantially as described.

23. The combination with an impact-engine of the type described, of an inertia-weight, arms thereon provided with bearings, trunnions on the casing of said engine fitted to said bearings, the passage admitting fluid under pressure to said engine comprising sections formed in a trunnion on the engine-casing and in the supporting-arm in which said trunnion is mounted, both of which communicate with an opening formed around the trunnion or its bearing, substantially as described.

24. The combination with an impact-engine of the type described, of an inertia-weight, arms rigidly secured thereto, said arms being provided with bearings to which are fitted trunnions formed on the engine-casing, the passage admitting fluid under pressure to said engine comprising sections formed in a trunnion and in the supporting-arm in which said trunnion is mounted, both of which communicate with an opening formed around the trunnion or its bearing, substantially as described.

25. The combination with an impact-engine, comprising a casing, a rod or stem fitted to and longitudinally movable in suitable bearings in said casing and means to impart a reciprocating movement to said rod or stem, of an inertia-weight, rigid arms thereon, to which the casing of the engine is connected, a flexible rope or the like attached to said inertia-weight, a pulley over which said rope passes and a counterbalance-weight secured to a rope on the opposite side of said pulley from the inertia-weight, substantially as described.

In testimony that I claim the foregoing as my invention I have hereunto set my hand this 16th day of July, 1900.

BYRON B. CARTER.

Witnesses:
F. E. LONAS,
R. R. STONE.